(12) United States Patent
Mori et al.

(10) Patent No.: US 7,123,553 B2
(45) Date of Patent: Oct. 17, 2006

(54) LENS SUPPORT MECHANISM, OPTICAL HEAD DEVICE AND OPTICAL INFORMATION PROCESSOR

(75) Inventors: Eishin Mori, Kyoto (JP); Jouji Anzai, Minoh (JP); Hideki Hayashi, Nara (JP); Yoshiaki Komma, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 103 days.

(21) Appl. No.: 10/512,897

(22) PCT Filed: May 22, 2003

(86) PCT No.: PCT/JP03/06371

§ 371 (c)(1),
(2), (4) Date: Oct. 28, 2004

(87) PCT Pub. No.: WO03/102940

PCT Pub. Date: Dec. 11, 2003

(65) Prior Publication Data

US 2005/0190665 A1    Sep. 1, 2005

(30) Foreign Application Priority Data

May 31, 2002  (JP) .............................. 2002-159083

(51) Int. Cl.
*G11B 7/00*  (2006.01)

(52) U.S. Cl. .................. 369/44.14; 369/44.17
(58) Field of Classification Search ............ 369/44.11, 369/44.17, 44.14
See application file for complete search history.

(56) References Cited

U.S. PATENT DOCUMENTS

| | | | |
|---|---|---|---|
| 4,918,702 A * | 4/1990 | Kimura ........................ 372/34 |
| 5,864,739 A * | 1/1999 | Kaneko et al. ............. 399/220 |
| 6,356,526 B1 | 3/2002 | Ito | |
| 6,710,932 B1* | 3/2004 | Kitaoka et al. ............. 359/686 |
| 2002/0114593 A1* | 8/2002 | Terada et al. .................. 385/93 |

FOREIGN PATENT DOCUMENTS

| | | |
|---|---|---|
| JP | 3-113842 | 5/1991 |
| JP | 9-198697 | 7/1997 |
| JP | 2000-123392 | 4/2000 |
| JP | 2000-242960 | 9/2000 |
| JP | 2000-242961 | 9/2000 |
| JP | 2000-266977 | 9/2000 |

* cited by examiner

*Primary Examiner*—Wayne Young
*Assistant Examiner*—Van T. Pham
(74) *Attorney, Agent, or Firm*—Hamre, Schumann, Mueller & Larson, P.C.

(57) ABSTRACT

A lens support mechanism including a semiconductor laser 10 for emitting a laser beam, an optical head enclosure 3 to which the semiconductor Laser 10 is fixed and located, a collimator lens 21 disposed coaxially with the laser beam emitted from the semiconductor laser 10, a resin cylinder 22 formed in a cylindrical shape so as to fix and locate the collimator lens 21 to the inner surface thereof and a cylindrical member 23 fitted to the resin cylinder 22 on a side of the collimator lens 21 opposite to the semiconductor laser 10 and formed so as to be fixed to the optical head enclosure 3. The cylindrical member 23 has almost the same linear expansion coefficient as that of the optical head enclosure 3.

7 Claims, 6 Drawing Sheets

LENS SUPPORT MECHANISM, OPTICAL HEAD DEVICE AND OPTICAL INFORMATION PROCESSOR

TECHNICAL FIELD

The present invention relates to a lens support mechanism for preventing focal length deviation or optical axis deviation due to expansion and contraction caused by a temperature change of a main part of optical members such as a lens or an optical enclosure. The present invention relates also to an optical head device and optical information processor using the same.

BACKGROUND ART

For providing storage media of high density and large capacity, optical memory techniques using optical disks having pit-like patterns have been applied further to digital audio disks, video disks, text file disks, and further to data files or the like. In such an optical memory technique, information is recorded and reproduced with a high accuracy and reliability into an optical disk via a finely-converged optical beam. Such a recording-reproducing operation largely depends on the optical system, and particularly, reduction of the temperature characteristics is extremely important in the recording-reproducing operation. An optical head device is configured by assembling optical members such as a light source, a photodetector, a half-mirror and a lens into a predetermined frame. The respective optical members must be positioned precisely for preventing deviation of the optical axis or deviation of the focal point position.

For example, JP2000-266977A discloses a method of fixing a cylinder integrated lens in a frame. FIG. 7 is a perspective view showing a configuration of a conventional lens support mechanism. A sensor lens 17 is formed by PC-integrally casting a concave lens 31 as a main part of the optical members, a lens barrel 32 formed to surround the concave lens 31, and three support arms 33, 34 and 35 extending outward from the lens barrel 32. In the support arms 33 and 34, vertical slits 33a and 33b are formed respectively to extend from the tops to the bottoms so that the distal end portions will be deformed resiliently with respect to the proximal end portions.

FIG. 8 is a cross-sectional view showing a conventional lens support mechanism in an attached state. In FIG. 8, the center of the concave lens 31 is determined as an origin point where X-, Y- and Z-axes cross each other at right angles and the Z-axis conforms with the optical axis of the concave lens 31. A plane defined by the X- and Y-axes will be referred to as a first reference plane I, and a plane defined by the Y- and Z-axes will be referred to as a second reference plane II. A frame 18 for supporting the sensor lens 17 is formed with a first support surface 26 and a second support surface 27 both extending along the first reference plane I, and also a third support surface 28 extending along the second reference plane II.

This frame 18 has a groove 29 in which almost a half of the cross section of a lens barrel 32 is received in a non-contact fashion. One side face of each of the support arm 33 and the support arm 34 is in contact with the first support surface 26 and the second support surface 27 of the frame 18. One side face of the support arm 35 is in contact with the third support surface 28 of the frame 18. In this manner, the sensor lens 17 is attached to the frame 18.

The sensor lens 17 is urged, via a leaf spring 36 fixed to the frame 18 as a resilient securing means, in a composite direction between the X-axis and the Y-axis as shown with a dotted arrow in FIG. 8. The distal ends of the support arms 33 and 34 are firmly fixed onto the respective support surfaces 26 and 27 of the frame 18 via adhesives 37 and 38 so as not to fall off the frame 18.

In the thus configured sensor lens 17, the support arms 33 and 34 are pressed resiliently via the leaf spring 36 against the support surfaces 26 and 27, and the support arm 35 is pressed resiliently against the support surface 28. In this manner, the center of the sensor lens 17 is fixed at the optical axis position.

FIG. 9 is a schematic view for explaining operations of a conventional lens support mechanism. As shown in FIG. 9, when the concave lens 31 and the lens barrel 32 thermally expand, the proximal end portions of the support arms 33 and 34 are shifted along the support surfaces 26 and 27, and the support arm 35 is shifted along the support surface 28. Since the distal end portions of the support arms 33 and 34 are fixed respectively at the support surfaces 26 and 27 by means of the adhesives 37 and 38, the displacement of the proximal end portions of the support arms 33 and 34 can be accommodated by the vertical slits 33a and 33b. In this case, the optical axis of the concave lens 31 does not change in position because the thermal expansion occurs only in a radial direction from the center of the lens 31.

As shown in FIG. 9, the distal end portions of the support arms 33 and 34 are fixed with the adhesives 37 and 38, and the center of the concave lens 31 is separated along the optical axis direction by a distance d from the position fixed by means of the adhesives 37 and 38. Therefore, the position of the concave lens 31 will be displaced along the optical axis direction by 'a distance (d)'דcoefficient of thermal expansion'×'ΔTm (temperature difference)' due to expansion and contraction caused by heat. Thus, the temperature characteristics of the entire optical pickup device can be improved further by intentionally creating a deviation in advance that can accommodate a deviation in the optical axis direction caused by expansion and contraction by heat of the other components such as a half-mirror, a collimator lens and an objective lens.

In an optical head device, it is required to assure an operation environment in a wide temperature range from a low temperature to a high temperature. In particular, temperature characteristics must be improved in order to prevent the collimator lens from defocusing with respect to the semiconductor laser. Since the optical head enclosure supporting the collimator lens expands due to temperature changes and since the stem expands in an area ranging from a laser attachment reference surface to an emission point, a displacement occurs between the emission point and the collimator lens. Furthermore, a back focus amount of the collimator lens will vary due to a change in oscillation wavelength of a laser diode and also changes in the refractive index and shape of the collimator lens.

However, since a light beam passing through the collimator lens will not become a parallel light beam due to the influences, a beam spot on the optical disk will be defocused.

In the above-described lens support mechanism, since a lens integrated with a lens barrel is fixed directly to a frame with an adhesive, the distance d along the optical axis direction cannot be determined quantitatively because of varying amount of the adhesives and varying positions for adhesion. This results in a problem that a deviation along an optical axis direction, which is caused by thermal expansion and contraction, cannot be accommodated quantitatively.

Furthermore, the lens integrated with a lens barrel has a complicated structure, and thus the production cost is increased and a further precise adjustment is required. As a result, an optical head device including the lens support mechanism of this lens integrated with a lens barrel and also an optical information device have problems of degradation of the temperature characteristics and high cost.

An object of the present invention is to provide a lens support mechanism that can accommodate displacement between an emission point and a collimator lens, which is caused by thermal expansion and thermal contraction, and provides also an optical head device and an optical information processor.

DISCLOSURE OF INVENTION

A lens support mechanism according to the present invention includes: a semiconductor laser for emitting a laser beam; an enclosure to which the semiconductor laser is fixed and located; a lens disposed coaxially with the laser beam emitted from the semiconductor laser; a first cylindrical member formed in a cylindrical shape so as to fix and locate the lens to the inner surface thereof, and a second cylindrical member fitted to the first cylindrical member on the side of the lens opposite to the semiconductor laser and formed so as to be fixed to the enclosure; wherein the second cylindrical member has a linear expansion coefficient substantially the same as the linear expansion coefficient of the enclosure.

Another lens support mechanism according to the present invention includes: a semiconductor laser for emitting a laser beam; a support base to which the semiconductor laser is fixed and located; a lens disposed coaxially with the laser beam emitted from the semiconductor laser; and a frame member formed so as to fix and locate the lens to the inner surface thereof, wherein the frame member is made of a material having a small linear expansion coefficient so that the distance between the semiconductor laser and the lens will not change substantially due to the temperature change.

A still further lens support mechanism according to the present invention includes: a semiconductor laser for emitting a laser beam; a support base to which the semiconductor laser is fixed and located; a lens disposed coaxially with the laser beam emitted from the semiconductor laser; a cylindrical frame member formed so as to fix and locate the lens to the inner surface thereof, and a plate fixed to the support base so as to fit to the frame member; wherein the plate has a linear expansion coefficient substantially the same as the linear expansion coefficient of the support base.

An optical head device according to the present invention is characterized in that it includes a lens support mechanism according to the present invention, and an objective lens for converging, onto an information recording medium, the laser beam that has passed through the lens provided to the lens support mechanism.

An optical information processor according to the present invention is characterized in that it includes an optical head device according to the present invention, a motor for rotating the information recording medium, a servo mechanism for controlling the position of the objective lens provided to the optical head device, on the basis of a focus error signal and a tracking error signal obtained from the optical head device; and an electric circuit for controlling the servo mechanism.

BEST MODE FOR CARRYING OUT THE INVENTION

Figure 1:
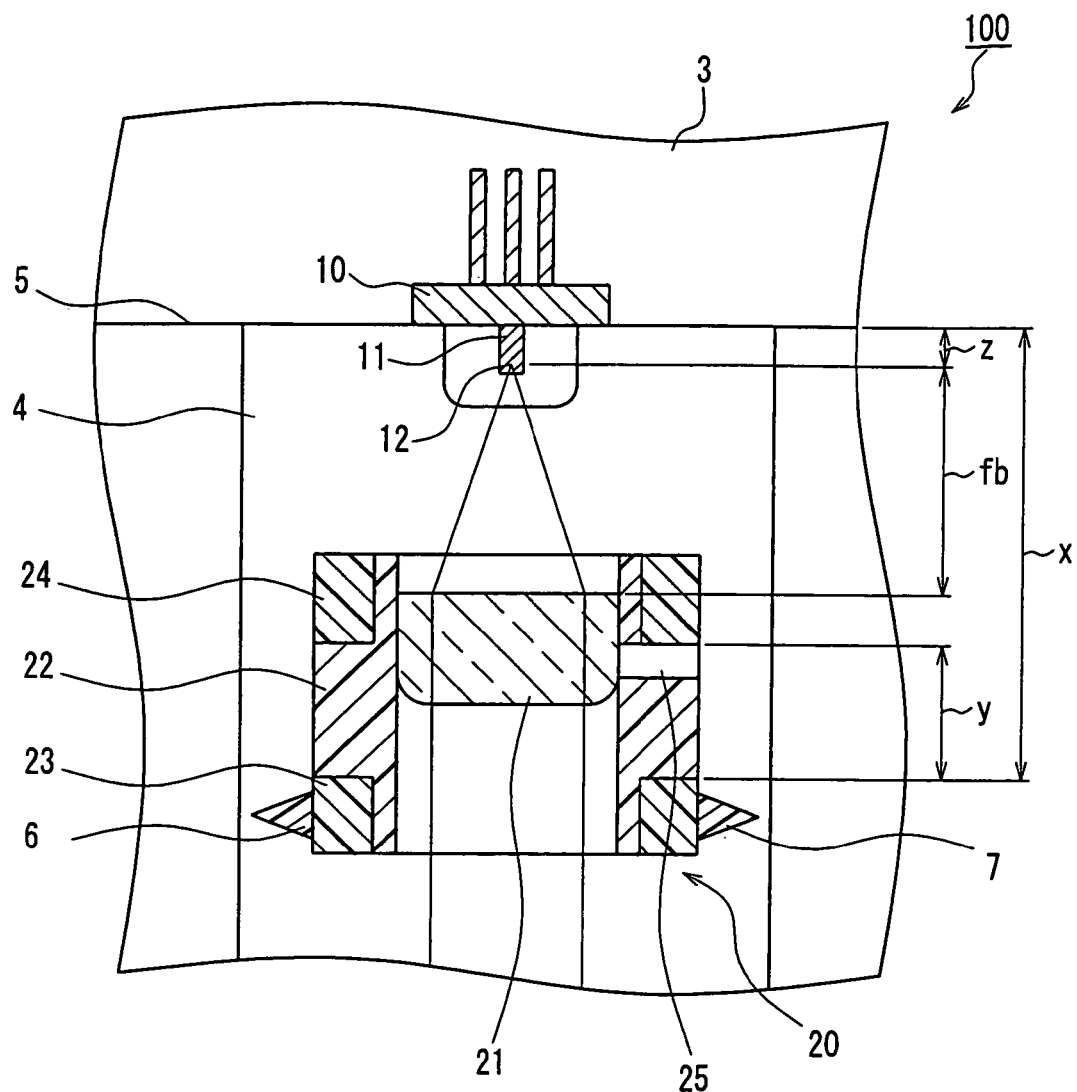
FIG. 1 is a cross-sectional view showing a configuration of a lens support mechanism according to a first embodiment.

In a lens support mechanism according to an embodiment of the present invention, a second cylindrical member, which fits to a first cylindrical member on a side of a lens opposite to a semiconductor laser and formed so as to be fixed to the enclosure, has a linear expansion coefficient substantially the same as a linear expansion coefficient of the enclosure. Therefore, the second cylindrical member thermally expands or thermally contracts so as to accommodate the thermal expansion or thermal contraction of the enclosure. As a result, an optical axis deviation or a focal length deviation of the lens can be prevented.

It is preferable that a shift variation $\Delta y$ per unit temperature of a distance y from a position at which the first cylindrical member and the second cylindrical member fit to each other to a position at which the lens is fixed to the first cylindrical member satisfies substantially Relation (1) below:

$$\Delta y = \Delta x - \Delta z - \Delta fb \qquad \text{Relation (1)}$$

where $\Delta x = \alpha x$, $\Delta y = \beta y$, $\Delta z = \gamma z$, $\Delta fb$: a back focus variation per unit temperature of the lens, $\alpha$: a linear expansion coefficient of the enclosure (unit:/K), $\beta$: a linear expansion coefficient of the first cylindrical member (unit:/K), $\gamma$: a linear expansion coefficient of a stem provided to the semiconductor laser (unit:/K), x: a distance from a reference surface for attachment of the semiconductor laser to a position at which the first cylindrical member and the second cylindrical member fit to each other, and z: a distance from a reference surface for attachment of the semiconductor laser to an emission point of the semiconductor laser.

It is preferable that the second cylindrical member and the enclosure are made of aluminum.

It is preferable that the second cylindrical member and the enclosure are made of zinc.

It is preferable that the second cylindrical member is made of zinc, and the enclosure is made of magnesium.

It is preferable that the second cylindrical member is made of zinc, and the enclosure is made of polyphenylene sulfide.

In another lens support mechanism according to the present embodiment, a frame member formed so as to fix and locate a lens to the inner surface thereof is made of a material having a small linear expansion coefficient so that the distance between the semiconductor laser and the lens will not change substantially. Therefore, the frame member for fixing and locating the lens will not thermally expand or contract substantially due to a temperature change. As a result, occurrence of optical axis deviation or focal length deviation of the lens can be prevented.

It is preferable that the frame member is made of a ceramic material.

It is preferable that a back focus variation $\Delta fb$ per unit temperature of the lens satisfies substantially Relation (2) below:

$$\Delta fb - \Delta z + \Delta L \approx 0 \qquad \text{Relation (2)}$$

where
$\Delta z = \gamma z$,
$\Delta L$: a shift per unit temperature of a distance from a reference surface for attachment of the semiconductor laser to a position at which the lens is fixed,
$\gamma$: a linear expansion coefficient of a stem provided to the semiconductor laser (unit:/K), and
z: a distance from a reference surface for attachment of the semiconductor laser to an emission point of the semiconductor laser.

In another lens support mechanism according to the present embodiment, a plate, which is fixed to a support base so as to fit to the frame member formed so as to fix and locate a lens to the inner surface thereof has a linear expansion coefficient substantially same as the linear expansion coefficient of the support base. Therefore, the plate will thermally expand or thermally contract so as to accommodate the thermal expansion or thermal contraction of the support base. As a result, the occurrence of optical axis deviation or focal length deviation of the lens can be prevented.

It is preferable that the frame member is made of a ceramic material.

It is preferable a back focus variation $\Delta fb$ per unit temperature of the lens satisfies substantially Relation (3) below:

$$\Delta fb - \Delta z + \Delta L + \Delta t \approx 0 \qquad \text{Relation (3)}$$

where
$\Delta z = \gamma z$,
$\Delta t = \alpha t$,
$\Delta L$: a shift per unit temperature of a distance from a reference surface for attachment of the semiconductor laser to a position at which the lens is fixed,
$\alpha$: a linear expansion coefficient of the support base and the plate (unit:/K)
$\gamma$: a linear expansion coefficient of a stem provided to the semiconductor laser (unit:/K),
z: a distance from a reference surface for attachment of the semiconductor laser to an emission point of the semiconductor laser, and
t: a fitting thickness of the frame member and the plate.

Embodiments of the present invention will be explained below by referring to the attached figures.

First Embodiment

Figure 2:
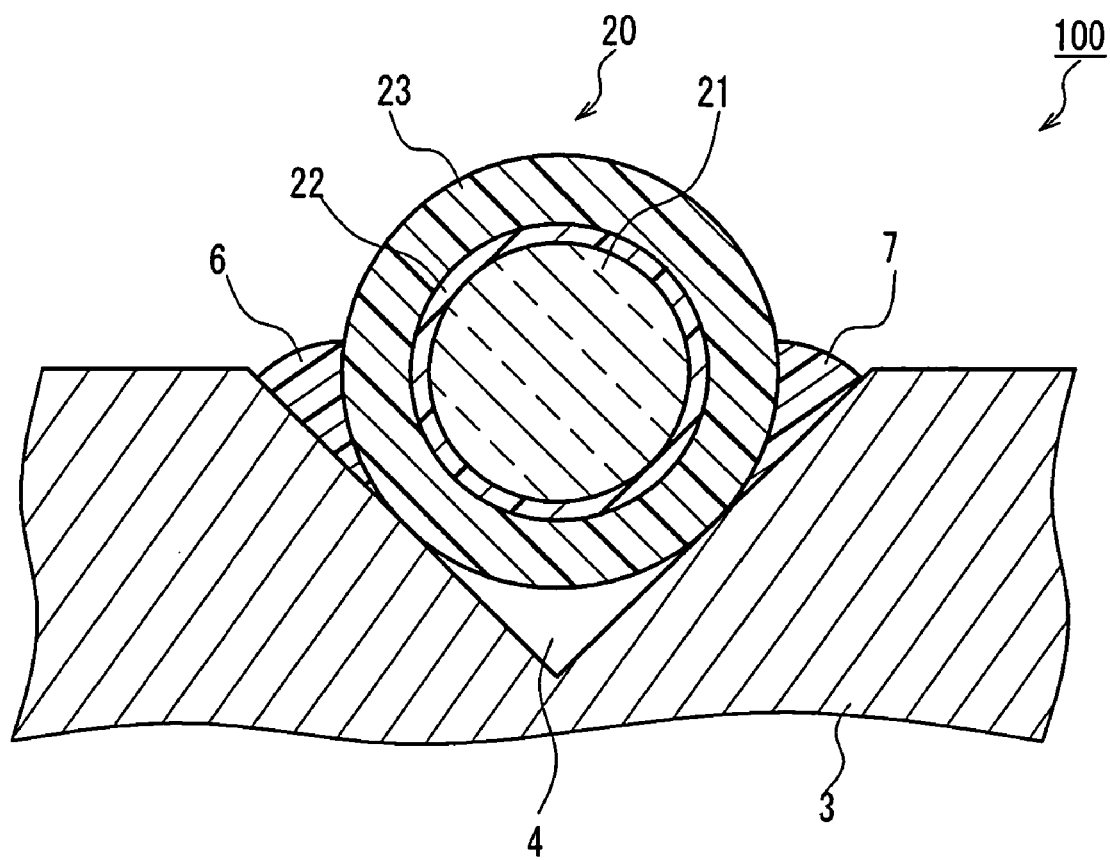
FIG. 2 is a front cross-sectional view showing the configuration of the lens support mechanism according to the first embodiment.
Figure 3:
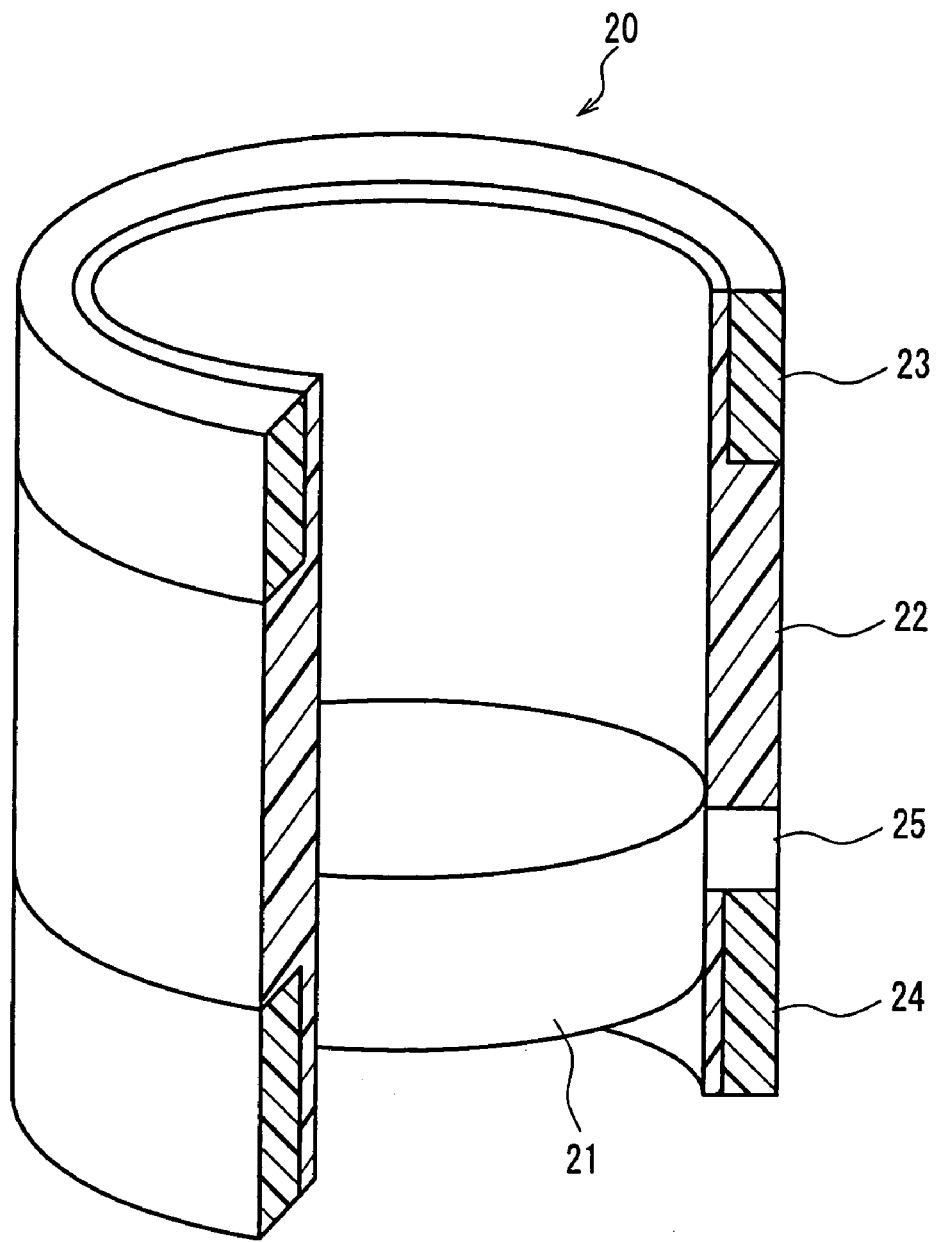
FIG. 3 is a partially sectional perspective view showing a cylindrical member provided to the lens support mechanism according to the first embodiment.

FIG. 1 is a cross-sectional view showing the configuration of a lens support mechanism 100 according to a first embodiment, and FIG. 2 is a front cross-sectional view showing the configuration of the lens support mechanism 100. FIG. 3 is a partially sectional view showing the configuration of a component 20 supported in the lens support mechanism 100.

The lens support mechanism 100 includes the component 20. The component 20 includes a resin cylinder 22 having stepped portions at the both ends and a part formed with a fixing hole 25 penetrating into the inner periphery, and also cylindrical members 23 and 24 made of a material having a linear expansion coefficient the same as that of an optical head enclosure 3. The cylindrical members 23 and 24 are fitted respectively to the ends of the resin cylinder 22, and integrated with the resin cylinder 22.

Even when the optical head enclosure 3 to which a semiconductor laser 10 is attached expands/contracts due to a temperature change and thus the optical axis position of the collimator lens 21 changes, the component 20 including the cylindrical members 23 and 24 made of a material having the same linear expansion coefficient as the optical head enclosure 3 expands/contracts similarly to the optical head enclosure 3. This can prevent the occurrence of optical axis deviation of the collimator lens 21 attached to the interior of the resin cylinder 22 of the component 20. The collimator lens 21 is inserted into the component 20 and fixed to the component 20 by filling the fixing hole 25 with an adhesive.

FIG. 1 illustrates the component 20 in an attached state. In FIG. 1, in the optical head enclosure 3 in which the semiconductor laser 10 is secured, a V-shaped groove 4 for housing the component 20 is formed in order to set the center of the collimator lens 21 at a predetermined optical axis position. By fixing the component 20 to the V-shaped groove 4 with the adhesives 6 and 7, the center of the collimator lens 21 is defined at the optical axis position.

The component 20 is configured as a structure satisfying Conditional expression 1 below.

$$\Delta y \approx \Delta x - \Delta z - \Delta fb \qquad \text{(Conditional Expression 1)}$$

Here,
$\Delta x = \alpha x$,
$\Delta y = \beta y$,
$\Delta z = \gamma z$
$\Delta fb$: a back focus variation per unit temperature of the collimator lens 21,
$\alpha$: a linear expansion coefficient of the optical head enclosure 3 (unit:/K),
$\beta$: a linear expansion coefficient of the resin cylinder 22 of the component 20 (unit:/K),
$\gamma$: a linear expansion coefficient of a stem 11 provided to the semiconductor laser 10 (unit:/K),
x: a distance from a reference surface 5 for attachment of the semiconductor laser 10 to a position at which the resin cylinder 22 and the cylindrical member 23 of the component 20 fit to each other,
y: a distance from a position at which the resin cylinder 22 and the cylindrical member 23 of the component 20 fit to each other to a position at which the collimator lens 21 is fixed,
z: a distance from a reference surface 5 for attachment of the semiconductor laser 10 to an emission point 12, and
fb: a focal length of the collimator lens 21.

This Conditional expression 1 is for setting a distance (y) from a position at which the resin cylinder 22 and the cylindrical member 23 of the component 20 fit to each other to a position at which the collimator lens 21 is fixed, so that a shift variation (Δy) per unit temperature of a distance y from the position at which the resin cylinder 22 and the cylindrical member 23 of the component 20 fit to each other to the position at which the collimator lens 21 is fixed will be equal substantially to a value obtained by differentiating, from a shift variation (Δx) per unit temperature of a distance x from the reference surface 5 for attachment of the semiconductor laser 10 of the optical head enclosure 3 to a position at which the resin cylinder 22 and the cylindrical member 23 of the component 20 fit to each other, the sum of the shift variation per unit temperature of the emission point 12 and a back focus variation per unit temperature of the collimator lens 21.

Therefore, even when there is a difference in temperature between the time of adjusting the collimator lens 21 and the time of an actual operation of the optical head device, the defocus is not so much as to affect the entire optical system configuring the optical head device.

Furthermore, by adhering and fixing the cylindrical member 23 having a linear expansion coefficient substantially equal to that of the optical head enclosure 3 to the resin cylinder 22, the distance y from a position at which the resin cylinder 22 and the cylindrical member 23 fit to each other to a position at which the collimator lens 21 is fixed can be set constantly even when the temperature changes, regardless of the amount of the adhesive and variation of the fixing positions.

According to the above configuration, even when the optical head enclosure 3, the stem 11 provided to the semiconductor laser 10 and the focal length of the collimator lens 21 expand and contract under influences of heat so as to change the distance between the emission point 12 of the semiconductor laser 10 and the collimator lens 21, the resin cylinder 22 expands and contract along the optical axis direction in order to reduce the deviation in the distance between the emission point 12 of the semiconductor laser 10 and the collimator lens 21, thereby accommodating the deviation caused by the expansion and contraction, and thus preventing the occurrence of deviation in focal length of the collimator lens 21 attached to the interior of the resin cylinder 22 of the component 20.

A specific example of this embodiment will be described below. In this example, the optical head enclosure 3 is made of aluminum, the resin cylinder 22 of the component 20 is made of polycarbonate, the cylindrical members 23 and 24 are made of aluminum, and the stem 11 provided to the semiconductor laser 10 is made of copper. When the collimator lens 21 has fb=6.2121 mm and Δfb=0.036 μm, $\alpha = 21 \times 10 E^{-6}$, $\beta = 70 \times 10 E^{-6}$, $\gamma = 17 \times 10 E^{-6}$, x=9.5 mm, y=2.0 mm, z=1.3 mm, $\Delta y = 70 \times 10 E^{-6} \times 2.0 \times 10 E^{+3} = 0.14$ μm, $\Delta x = 21 \times 10 E^{-6} \times 9.5 \times 10 E^{+3} = 0.1995$ μm, $\Delta z = 17 \times 10 E^{-6} \times 1.3 \times 10 E^{+3} = 0.0221$ μm, Δfb=0.036 μm.

Thereby, Δx−Δz−Δfb=0.1414 μm, satisfying the condition of Δy≈Δx−Δz−Δfb. In this manner, the defocus amount per unit temperature can be set to 0.0014 μm so as to obtain preferable temperature characteristics.

When the optical head enclosure 3 is made of zinc, the resin cylinder 22 of the component 20 is made of polycarbonate, the cylindrical members 23 and 24 are made of zinc, the stem 11 of the semiconductor laser 10 is made of copper, and when the collimator lens 21 has fb=6.2121 μm and Δfb=0.036 μm, $\alpha = 33 \times 10 E^{-6}$, $\beta = 70 \times 10 E^{-6}$, $\gamma = 17 \times 10 E^{-6}$, x=12.6 mm, y=5.1 mm, z=1.3 mm, $\Delta y = 70 \times 10 E^{-6} \times 5.1 \times 10 E^{+3} = 0.357$ μm, $\Delta x = 33 \times 10 E^{-6} \times 12.6 \times 10 E^{+3} = 0.4158$ μm, $\Delta z = 17 \times 10 E^{-6} \times 1.3 \times 10 E^{+3} = 0.0221$ μm, Δfb=0.036 μm.

Thereby, Δx−Δz−Δfb=0.358 μm, satisfying the condition of Δy≈Δx−Δz−Δfb. In this manner, the defocus amount per unit temperature can be set to 0.001 μm so as to obtain preferable temperature characteristics.

Furthermore, when the optical head enclosure 3 is made of magnesium, the resin cylinder 22 of the component 20 is made of polycarbonate, the cylindrical members 23 and 24 are made of zinc, the stem 11 of the semiconductor laser 10 is made of copper, and when the collimator lens 21 has fb=6.2121 μm and Δfb=0.036 μm, $\alpha = 25.6 \times 10 E^{-6}$, $\beta = 70 \times 10 E^{-6}$, $\gamma = 17 \times 10 E^{-6}$, x=10.5 mm, y=3.0 mm, z=1.3 mm, $\Delta y = 70 \times 10 E^{-6} 3.0 \times 10 E^{+3} = 0.21$ μm, $\Delta x = 25.6 \times 10 E^{-6} \times 10.5 \times 10 E^{+3} = 0.2688$ μm, $\Delta z = 17 \times 10 E^{-6} \times 1.3 \times 10 E^{+3} = 0.0221$ μm, Δfb=0.036 μm.

Thereby, Δx−Δz−Δfb=0.2107 μm, satisfying the condition of Δy≈Δx−Δz−Δfb. In this manner, the defocus amount per unit temperature can be set to 0.0007 μm so as to obtain preferable temperature characteristics.

Furthermore, when the optical head enclosure 3 is made of polyphenylene sulfide, the resin cylinder 22 of the component 20 is made of polycarbonate, the cylindrical members 23 and 24 are made of zinc, the stem 11 of the semiconductor laser 10 is made of copper, and when the collimator lens 21 has fb=6.2121 µm and Δfb=0.036 µm, $\alpha = 19.9 \times 10E^{-6}$, $\beta = 70 \times 10E^{-6}$, $\gamma = 17 \times 10E^{-6}$, x=9.3 mm, y=1.8 mm, z=1.3 mm, $\Delta y = 70 \times 10E^{-6} \times 1.8 \times 10E^{+3} = 0.126$ µm, $\Delta x = 19.9 \times 10E^{-6} \times 9.3 \times 10E^{+3} = 0.18507$ µm, $\Delta z = 17 \times 10E^{-6} \times 1.3 \times 10E^{+3} = 0.0221$ µm, Δfb=0.036 µm.

Thereby, Δx−Δz−Δfb=0.12697 µm, satisfying the condition of Δy≈Δx−Δz−fb. In this manner, the defocus amount per unit temperature can be set to 0.00097 µm so as to obtain preferable temperature characteristics.

In this embodiment, the optical head enclosure 3 is made of aluminum, zinc, magnesium or polyphenylene sulfide resin, the collimator lens 21 faces the semiconductor laser 10, and the resin cylinder 22 of the component 20 is made of polycarbonate. The present invention is not limited to this example, but any combination of configurations satisfying the above-mentioned Conditional expression 1 can be used.

Though the component in this embodiment is configured separately and assembled integrally with the collimator lens, the component and the collimator lens can be configured integrally.

Furthermore, the lens support mechanism according to the present invention can be applied to other optical systems.

Further, when the optical head device has a plurality of semiconductor lasers whose wavelengths are different from each other, one lens support mechanism is provided for each of the semiconductor lasers. According to this configuration, even when an optical head enclosure provided with each of the semiconductor laser expands and/or contracts and thus the optical axis position changes, the component will expand and contract similarly to the optical head enclosure, since it is secured to the optical head enclosure by means of the cylindrical members made of a material having the same linear expansion coefficient as the optical head enclosure. As a result, the optical axis position of the lens will not change, and thus parallel light will be emitted stably from the collimator lens even if the temperature changes. This results in a preferable temperature characteristic that the collimator lens will not be defocused with respect to the semiconductor laser, thereby assuring an operation environment in a wide temperature range from a low temperature to a high temperature.

In conclusion, according to the first embodiment, a cylindrical member 23 fitted to the resin cylinder 22 on the side of the collimator lens 21 opposite to the semiconductor laser 10 and formed so as to be fixed to the optical head enclosure 3 has substantially the same linear expansion coefficient as the linear expansion coefficient of the optical head enclosure 3. As a result, the cylindrical member 23 will thermally expand or thermally contract so as to accommodate the thermal expansion or thermal contraction of the optical had enclosure 3, thereby preventing the occurrence of optical axis deviation or focal length deviation of the collimator lens 21.

Second Embodiment

Figure 4:
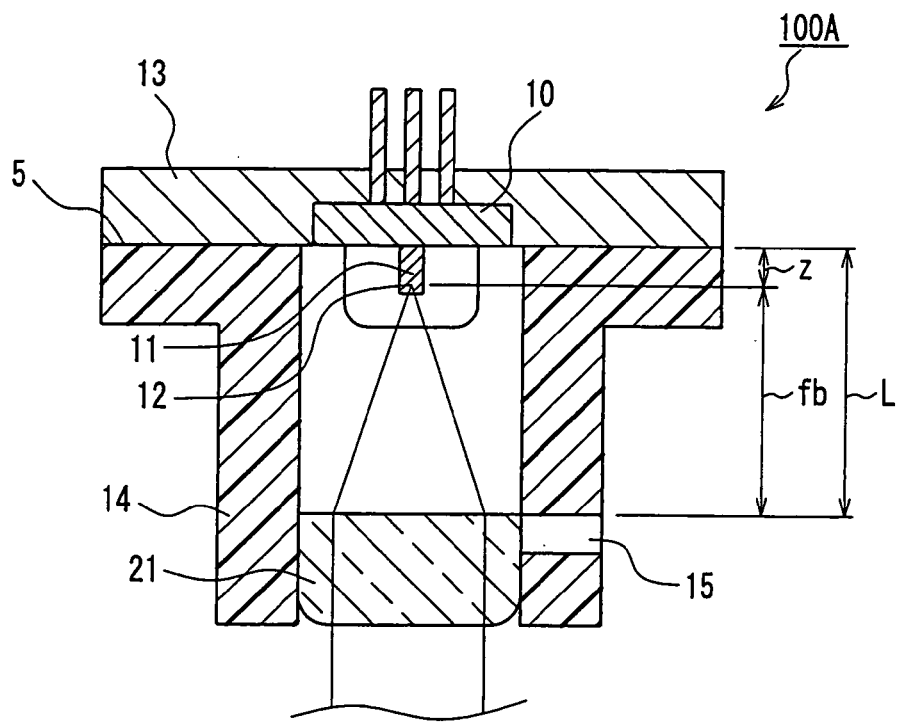
FIG. 4 is a cross-sectional view showing a configuration of a lens support mechanism according to a second embodiment.

FIG. 4 is a cross-sectional view showing a configuration of a lens support mechanism 100A according to a second embodiment. The lens support mechanism 100A has a semiconductor laser support base 13 with a semiconductor laser 10. The semiconductor laser support base 13 is equipped in a frame member 14 shaped like a substantial hollow cylinder. A collimator lens 21 is inserted into the frame member 14. The collimator lens 21 is fixed to the frame member 14 by filling a fixing hole 15 formed in the frame member 14 with an adhesive, and defined at a predetermined optical axis position.

Since the frame member 14 is made of a ceramic material that does not change its shape substantially regarding temperature change, preferable temperature characteristics can be obtained.

The frame member 14 is formed as a lens support structure satisfying Conditional expression 2 below.

$$\Delta fb - \Delta z + \Delta L \approx 0 \qquad \text{(Conditional Expression 2)}$$

Here,

Δz=γz,

Δfb: a back focus variation per unit temperature of the collimator lens 21,

ΔL: a shift per unit temperature of a distance from a reference surface 5 for attachment of the semiconductor laser 10 to a position at which the collimator lens 21 is fixed, γ: a linear expansion coefficient of a stem 11 of the semiconductor laser 10 (unit:/K), z: a distance from a reference surface 5 for attachment of the semiconductor laser to an emission point 12, fb: a focal length of the collimator lens 21, and L: a distance from the reference surface 5 for attachment of the semiconductor laser to the position at which the collimator lens 21 is fixed.

A further specific example of the second embodiment will be described below. When the ceramic material of the frame member 14 is a cordierite ceramic, the stem 11 of the semiconductor laser 10 is made of copper, and when the collimator lens 21 has fb=6.2121 µm and Δfb=0.036 µM, as the cordierite ceramic has a linear expansion coefficient of $-5.0 \times 10E^{-7}$ (unit:/K), $\Delta L = -5.0 \times 10E^{-7} \times 6.2121 \times 10E^{+3} = -0.0031$ µm, $\Delta z = 17 \times 10E^{-6} \times 1.3 \times 10E^{+3} = 0.0221$ µm, Δfb=0.036 µm.

Therefore, it is possible to set Δfb−Δz+ΔL=0.0108 µm, and since the distance between the collimator lens 21 and the emission point 12 of the semiconductor laser 10 will be difficult to change with respect to the temperature change, preferable temperature characteristics can be obtained.

In the second embodiment, a cordierite ceramic was used for the material of the component 20. The present invention is not limited to this example, but the component 20 can be made of any ceramics or the like that will not change substantially with respect to a temperature change.

Furthermore, the lens support mechanism of the present invention can be applied to other optical systems.

Further, when the optical head device has a plurality of semiconductor lasers having wavelengths different from each other, one lens support mechanism is provided for each of the semiconductor lasers so that parallel light will be emitted stably from this collimator lens even when the temperature changes. As a result, a preferable temperature characteristic that the collimator lens will not be defocused with respect to the semiconductor laser can be obtained. In this manner, an operation environment in a wide temperature range from a low temperature to a high temperature can be assured.

Third Embodiment

Figure 5:
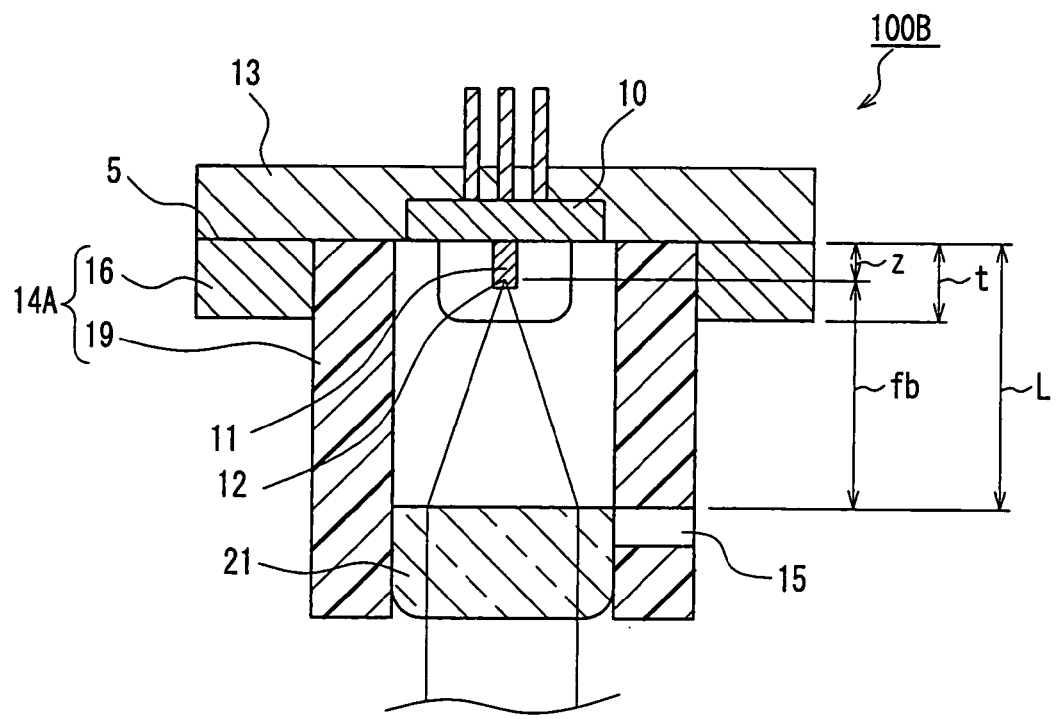
FIG. 5 is a cross-sectional view showing a configuration of a lens support mechanism according to a third embodiment.

FIG. 5 is a cross-sectional view showing a configuration of a lens support mechanism 100B according to a third embodiment.

A frame member 14A includes a ceramic cylinder 19 having a fixing hole 15 formed at a part thereof and penetrating to the inner periphery, and a plate 16 made of a material having a linear expansion coefficient the same as that of a laser support base 13. The plate 16 is fitted at one end of the ceramic cylinder 19, and configured integrally with the ceramic cylinder 19.

Even when the laser support base 13 to which the semiconductor laser 10 is attached expands and contracts due to the temperature change, the plate 16 will expand and contract similarly to the laser support base 13 since the ceramic cylinder 19 is fitted to the plate 16 made of a material having the same linear expansion coefficient as the laser support base 13, thereby preventing the occurrence of optical axis deviation of the collimator lens 21 attached to the ceramic cylinder 19. The collimator lens 21 is inserted into the ceramic cylinder 19 and fixed to the frame member 14A by filling the fixing hole 15 with an adhesive.

This frame member 14A is configured as a lens support structure that satisfies Conditional expression 3 below.

$$\Delta fb - \Delta z + \Delta L + \Delta t \approx 0 \quad \text{(Conditional Expression 3)}$$

Here, $\Delta z = \gamma z$, $\Delta t = \alpha t$, $\Delta fb$: a back focus variation per unit temperature of the collimator lens 21, $\Delta L$: a shift per unit temperature of a distance from a reference surface 5 for attachment of the semiconductor laser 10 to a position at which the collimator lens 21 is fixed, $\alpha$: a linear expansion coefficient of the laser support base 13 (unit:/K)

$\gamma$: a linear expansion coefficient of the stem 11 of the semiconductor laser 10 (unit:/K, z: a distance from the reference surface 5 for attachment of the semiconductor laser to an emission point 12, fb: a focal length of the collimator lens 21, L: a distance from the reference surface 5 for attachment of the semiconductor laser to a position at which the collimator lens 21 is fixed, and t: a fitting thickness of the ceramic cylinder 19 and the plate 16.

A specific example of the third embodiment will be described below. When the laser support base 13 is made of aluminum, the ceramic material of the ceramic cylinder 19 is a cordierite ceramic, the stem 11 of the semiconductor laser 10 is made of copper, the cordierite ceramic has a linear expansion coefficient of $-5.0 \times 10E^{-7}$ (unit:/K), the collimator lens 21 has fb=6.2121 µm and $\Delta$fb=0.036 µm, and when the fitting thickness (t) of the ceramic cylinder 19 and the plate 16 is $1.5 \times 10E^{-3}$, $\Delta L = -5.0 \times 10E^{-7} \times 6.2121 \times 10E^{+3} = -0.0031$ µm, $\Delta z = 17 \times 10E^{-6} \times 1.3 \times 10E^{-3} = 0.0221$ µm, $\Delta t = 21 \times 10E^{-6} \times 1.5 \times 10E^{-3} = 0.0315$ µm, and $\Delta fb = 0.036$ µm.

Therefore, it is possible to set $\Delta fb - \Delta z + \Delta L + \Delta t = 0.0423$ µm, and since the distance from the collimator lens 21 to the emission point 12 of the semiconductor laser 10 will be difficult to change with respect to the temperature change, preferable temperature characteristics can be obtained.

In the third embodiment, a cordierite ceramic was used for the material of the ceramic cylinder 19. Any ceramic materials or the like can be used as long as the materials experience substantially no change with respect to temperature change.

Furthermore, the lens support mechanism of the present invention can be applied to other optical systems.

Further, when the optical head device has a plurality of semiconductor lasers having wavelengths different from each other, one lens support mechanism is provided for each of the semiconductor lasers so that parallel light will be emitted stably from this collimator lens even when the temperature changes. As a result, a preferable temperature characteristic that the collimator lens will not be defocused with respect to the semiconductor laser can be obtained. In this manner, an operation environment in a wide temperature range from a low temperature to a high temperature can be assured.

Fourth Embodiment

Figure 6:
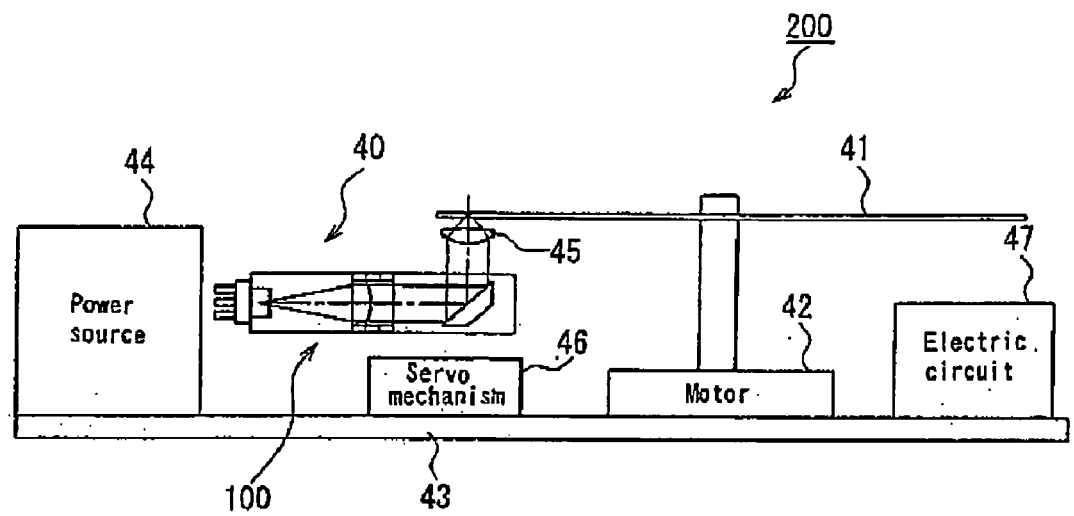
FIG. 6 is a block diagram schematically showing a configuration of an optical information processor according to a fourth embodiment.
Figure 7:
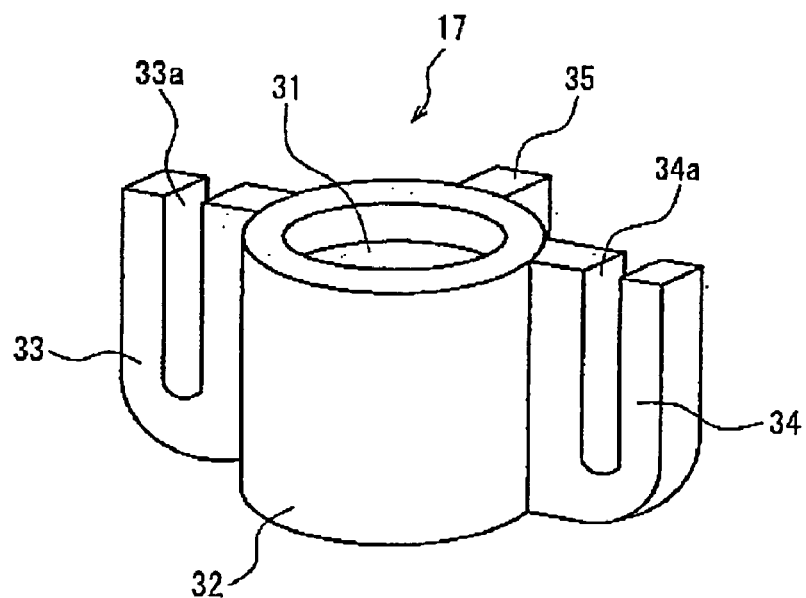
FIG. 7 is a perspective view showing a configuration of a conventional lens support mechanism.
Figure 8:
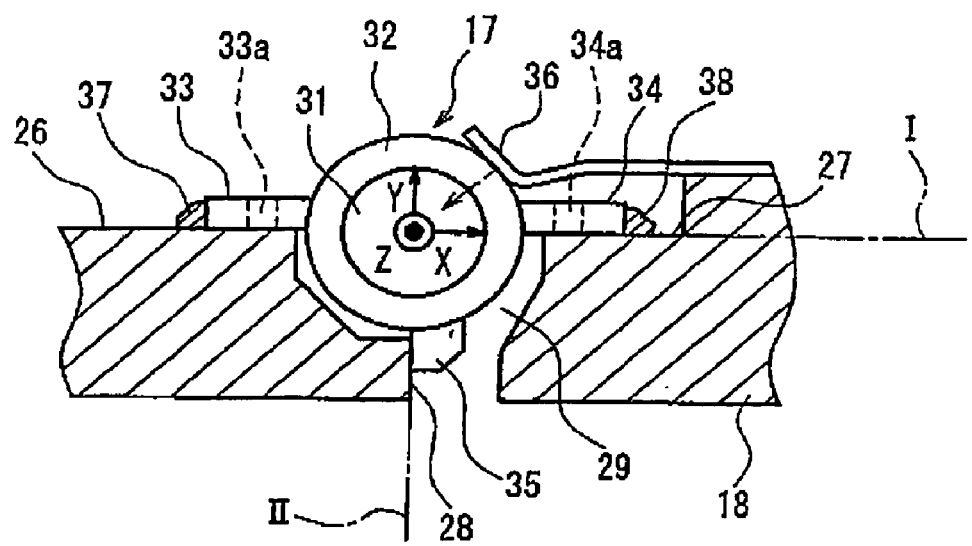
FIG. 8 is a cross-sectional view showing a conventional lens support mechanism in an attached state.
Figure 9:
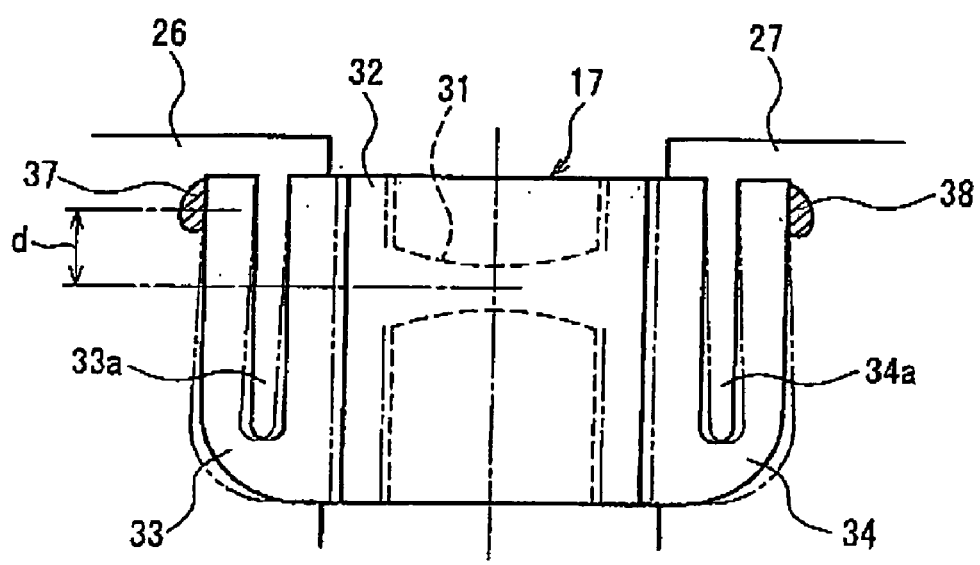
FIG. 9 is a schematic view for explaining operations of a conventional lens support mechanism.

FIG. 6 is a block diagram for schematically showing a configuration of an optical information processor 200 according to a fourth embodiment. The optical information processor 200 includes an optical head device 40 having the lens support mechanism 100 as described in the first embodiment. The optical head device 40 further has an objective lens 45. The objective lens 45 converges, onto an optical disk 41, a laser beam that has passed through a lens in the lens support mechanism 100.

To the optical information processor 200, a motor 42 for supporting and rotating the optical disk 41 is provided. The optical information processor 200 is provided with a servo mechanism 46. The servo mechanism 46 is provided in order to control a position of the objective lens 45 provided for the optical head device 40, on the basis of a focus error signal and a tracking error signal obtained from the optical head device 40.

The optical information processor 200 includes an electric circuit 47 provided for controlling the servo mechanism 46, and a power source 44 for supplying power to the electric circuit 47, the servo mechanism 46 and to the motor 42. These electric circuit 47, servo mechanism 46, motor 42 and power source 44 are provided on a circuit board 43.

In the thus configured optical information processor 200, when the power source 44 supplies power to the motor 42, the servo mechanism 46 and the electric circuit 47, the optical disk 41 is rotated by the motor 42. And the optical head device 40 sends a signal corresponding to a positional relation with the optical disk 41 (focus error signal, tracking error signal) to the servo mechanism 46. The servo mechanism 46 calculates this signal and supplies the optical head device 40 with a signal for subtly shifting the position of either the optical head device 40 or the objective lens 45 within the optical head device 40 for the purpose of controlling the positions of the optical head 40 or the objective lens 45. The optical head device 40 performs focus servo and tracking servo with respect to the optical disk 41, and conducts reading, writing or erasing of information with respect to the optical disk 41. The power source can be provided outside the optical information processor 200.

INDUSTRIAL APPLICABILITY

As mentioned above, the present invention can provide a lens support mechanism an optical head device and an optical information processor that can accommodate positional deviation between an emission point and a collimator lens caused by thermal expansion and thermal contraction.

The invention claimed is:
1. A lens support mechanism comprising:
a semiconductor laser for emitting a laser beam;
an enclosure to which the semiconductor laser is fixed and located;
a lens disposed coaxially with the laser beam emitted from the semiconductor laser;
a first cylindrical member formed in a cylindrical shape so as to fix and locate the lens at the inner surface thereof; and
a second cylindrical member fitted to the first cylindrical member on a side of the lens opposite at the semiconductor laser and formed so as to be fixed to the enclosure;
wherein the second cylindrical member has a linear expansion coefficient substantially the same as the linear expansion coefficient of the enclosure,
wherein a shift variation $\Delta y$ per unit temperature of a distance y from a position at which the first cylindrical member and the second cylindrical member fit to each other to a position at which the lens is fixed to the first cylindrical member satisfies substantially Relation (1) below:

$$\Delta y \approx \Delta x - \Delta z - \Delta fb \qquad \text{(Relation 1)}$$

where
$\Delta x = \alpha x$,
$\Delta y = \beta Y$,
$\Delta z = \gamma z$
$\Delta fb$: a back focus variation per unit temperature of the lens,
$\alpha$: a linear expansion coefficient of the enclosure (unit:/K),
$\beta$: a linear expansion coefficient of the first cylindrical member (unit:/K),
$\gamma$: a linear expansion coefficient of a stem provided to the semiconductor laser (unit:/K),
x: a distance from a reference surface for attachment of the semiconductor laser to a position at which the first cylindrical member and the second cylindrical member fit to each other, and
z: a distance from a reference surface for attachment of the semiconductor laser to an emission point of the semiconductor laser.
2. The lens support mechanism according to claim 1, wherein the second cylindrical member and the enclosure are made of aluminum.
3. The lens support mechanism according to claim 1, wherein the second cylindrical member and the enclosure are made of zinc.
4. The lens support mechanism according to claim 1, wherein the second cylindrical member is made of zinc, and the enclosure is made of magnesium.
5. The lens support mechanism according to claim 1, wherein the second cylindrical member is made of zinc, and the enclosure is made of polyphenylene sulfide.
6. An optical head device comprising:
a lens support mechanism according to claim 1, and
an objective lens for converging, onto an information recording medium, the laser beam that has passed through the lens provided for the lens support mechanism.
7. An optical information processor comprising:
the optical head device according to claim 6,
a motor for rotating the information recording medium;
a servo mechanism for controlling the position of the objective lens provided to the optical head device, on the basis of a focus error signal and a tracking error signal obtained from the optical head device; and
an electric circuit for controlling the servo mechanism.

* * * * *

UNITED STATES PATENT AND TRADEMARK OFFICE
CERTIFICATE OF CORRECTION

PATENT NO. : 7,123,553 B2 Page 1 of 1
APPLICATION NO. : 10/512897
DATED : October 17, 2006
INVENTOR(S) : Mori et al.

It is certified that error appears in the above-identified patent and that said Letters Patent is hereby corrected as shown below:

Title page, column 2, line 3 of the Abstract: "Laser" should read --laser--.
Title page, column 2, line 7 of the Abstract: ""thereof and" should read --thereof, and--.
Column 14, line 33(claim 6): "claim 1, " should read --claim 1; --.
Column 14, line 39(claim 7): "claim 6, " should read --claim 6; --.

Signed and Sealed this

Fifteenth Day of May, 2007

JON W. DUDAS
*Director of the United States Patent and Trademark Office*